Patented Aug. 9, 1938

2,126,180

UNITED STATES PATENT OFFICE 2,126,180

UREIDO N-DIARYL DICARBOXYLIC ACID HALIDES

George Malcolm Dyson, Cheadle Hulme, and Arnold Renshaw, Manchester, England, assignors to Parke, Davis & Company, Detroit, Mich., a corporation of Michigan No Drawing. Original application January 16, 1929, Serial No. 333,020. Patent No. 1,969,299, dated August 7, 1934. Divided and this application July 25, 1934, Serial No. 736,900. In Great Britain February 1, 1928

4 Claims. (Cl. 260—123)

Our invention relates to ureido N-diaryl dicarboxylic acid halides.

This application is a division of application, Serial No. 333,020, filed January 16, 1929, now Patent 1,969,299, of Aug. 7, 1934, and relates more particularly to certain new diaryl diacid halides and the process of preparing the same.

We have found that by the action of thionyl chloride, phosphorus pentachloride, phosphorus trichloride and similar substances upon dicarboxylic aryl ureas or dicarboxylic aryl thioureas or their substitution products, a new series of aryl urea acid halides is produced; we have also found that similar substances may be produced by the action of thionyl chloride, or phosphorus chlorides upon carboxyl substituted aryl isocyanates or isothiocyanates followed by treatment of the carbimide or thiocarbimide aryl acyl halides so obtained with amino aryl carboxylic acids, amino carboxylic acid derivatives of quinoline, benzthiazole or the like, followed by further treatment with thionyl chloride.

According to our invention we may advantageously use as a starting material a urea diaryl dicarboxylic acid or a thiourea diaryl dicarboxylic acid. Examples of these bodies which can be used in our process are:

1. N,N-diphenyl-urea-3,3'-dicarboxylic acid;
2. N - benzthiazolyl-N'-phenyl-urea-6,3'-dicarboxylic acid;
3. N,N-diphenyl-urea-3,3'-dicarboxylic acid;
4. N - phenyl-N'-(4'-quinolyl)-urea-3,6'-dicarboxylic acid;
5. N,N'- diphenyl-2-methoxy-4'- nitro-3,3'- dicarboxylic acid;
6. N,N' - diphenyl - thiourea - 3,3'- dicarboxylic acid.

The above diaryl urea (or thiourea) dicarboxylic acids may be represented by the following generic formula:

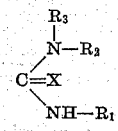

in which either $R_1$ or $R_2$ represent hydrogen, the other representing a carboxyl substituted aryl nucleus, $R_3$ represents a carboxyl substituted aryl nucleus, X represents S or O, and in which the aryl nuclei may be further substituted. These urea or thiourea diaryl dicarboxylic acids are treated with thionyl chloride in excess until solution is complete. The excess of thionyl chloride is removed by distillation (with or without inert liquid such as benzene) thereby obtaining the residual diaryl urea (or thiourea) dicarboxylic acid chlorides. These diacid chloride compounds are new compounds and form part of the subject matter of this invention. The following are the diacid chlorides which correspond respectively to the diaryl urea (or thiourea) dicarboxylic acids listed above:

1. N,N'- diphenyl-urea - 3,3'- dicarboxylic acid chloride;

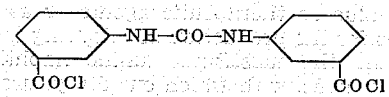

2. N-benzthiazolyl-N'-phenyl-urea-6,3'- dicarboxylic acid chloride;

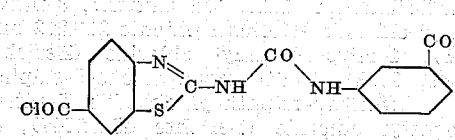

3. N,N - diphenyl-urea - 3,3'- dicarboxylic acid chloride;

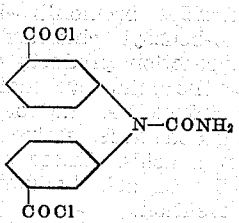

4. N-phenyl-N'-(4'- quinolyl)-urea-3,6'- dicarboxylic acid chloride;

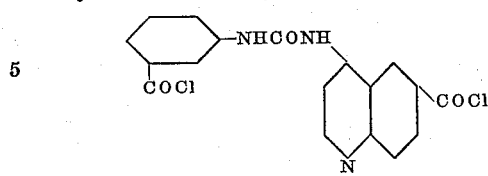

5. N,N'- diphenyl-2-methoxy-4'- nitro-3,3'- dicarboxylic chloride;

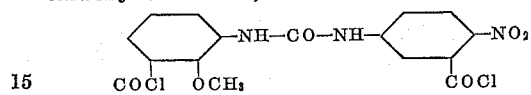

6. N,N'- diphenyl - thiourea - 3,3' -dicarboxylic acid chloride;

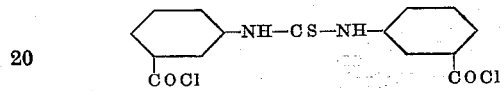

Instead of using thionyl chloride, other thionyl halides may be used, thus forming the corresponding diacid bromides, iodides, etc. It will be understood also that instead of the thionyl halides, phosphorus pentachloride, phosphorus trichloride and the other corresponding halides may be used.

The diacid chlorides are then reacted with a primary aryl amine or advantageously with an amino naphthalene sulphonic acid or an amino acenaphthene sulphonic acid or an amino arylido naphthalene sulphonic acid to form the ureids in accordance with our Patent No. 1,969,299 above referred to.

In carrying out the process of our invention we may react diaryl urea acid halides, formed as above, with an amino acenaphthene sulphonic acid or an amino naphthalene sulphonic acid or with their substituents. The diaryl urea acid halides may also be reacted with the products obtained by reducing the nitro-compounds obtained by the action on 1-amino naphthalene sulphonic acids of chlorides of nitro-aryl fatty acids and nitro-aryl chlorides, nitro-aryl olefinic-carboxylic acid chlorides, nitro-aryl sulpho-chlorides or their substitution products, and in this way obtain symmetrical or unsymmetrical ureids which are of value as therapeutic agents or as intermediates for the production of colouring matters.

To form the substituted amino naphthalene sulphonic acids, with which our diaryl urea acid halides can be reacted to form the ureids of our invention, we may react upon an amino naphthalene sulphonic acid with a nitro-aryl chloride, for example, 2 nitro-cinnamyl chloride (Berichte 16, 34, Beilstein 2, 1414, 3rd edition), 3-nitrocinnamyl chloride (German patents 288,272 and 288,273), 4-nitro-cinnamyl chloride (Berichte 1916, 49, 2688), 1-nitro-naphthalene-5-sulphochloride, 1:5:nitro-naphthoyl chloride, 2-nitrophenylacetyl chloride (Berichte 43, 2547), 4-nitro-phenylacetyl chloride, nitro-benzoyl chlorides, nitro-anisoyl chlorides, nitro-toluyl chlorides, nitro-benzene sulpho-chlorides, chloronitro-benzoyl chlorides, bromonitro-benzoyl chlorides, iodonitro-benzoyl chlorides. The nitro groups in the reaction products of the above compounds with the amino naphthalene sulphonic acids can be reduced to amino groups. The products can then be termed amino arylido naphthalene sulphonic acids. These bodies reacted with our diaryl urea acid halides produce the ureids of our invention.

Among the amino naphthalene sulphonic acids which can be used in our process there may be mentioned 1,8-amino naphthol-3,6-disulphonic acid, 1-naphthylamine-4,8-disulphonic acid, 1-naphthylamine-4,6,8-trisulphonic acid, chloronaphthylamine sulphonic acid, bromo- or iodo-naphthylamine sulphonic acids, obtained by halogenating naphthylamine sulphonic acids by known methods or by halogenating the acetyl-naphthylamine sulphonic acids by known methods and hydrolyzing the products; alkoxynaphthylamine sulphonic acids, 1,5-amino naphthol-7-sulphonic acid, 2,8-amino naphthol-3,6-disulphonic acid.

Among the amino acenaphthene sulphonic acids which can be used in our invention, there may be mentioned 4-amino acenaphthene-5-sulphonic acid

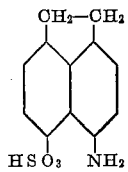

and 4-amino acenaphthene-3-sulphonic acid (Fleischer and Schranz, Ber. 55, 3253 (1922), G. T. Morgan and V. E. Yarsley, Journal of the Society of Chemical Industry, 44, 513T (1925), 4-amino acenaphthene-3:5-disulphonic acid (G. T. Morgan and V. E. Yarsley, Journal of the Society of Chemical Industry, 44, 513T (1925), and 4-amino acenaphthene-trisulphonic acids, obtained by further sulphonation of 4-amino acenaphthene-5-sulphonic acid with oleum or of 4-nitro-acenaphthene-5-sulphonic acid with oleum and reduction of the $NO_2$ group.

The finished products may be purified in any suitable manner, as, for instance, by solution in glacial acetic acid, or any other suitable solvent, and precipitation of the substance from solution by acetone, ether or other suitable precipitant.

As an example of this synthetic process, the following manner of preparing a urea compound is cited:

Example m-Amino benzoic acid is dissolved in a dilute aqueous solution of caustic soda and phosgene gas passed into the solution so obtained which may be artificially cooled; or, alternatively, the solution of sodium m-amino benzoate is treated with a solution of phosgene in an inert solvent such as tetrachlorethane or toluene; or, alternatively, the m-amino benzoic acid may be dissolved in a mixture of non-aqueous solvents of which pyridine forms a component part, and treated with phosgene alone or in solution. In each case, the compound diphenyl urea-3,3'-dicarboxylic acid separates and is removed and dried.

The dry diphenyl urea 3,3' dicarboxylic acid is heated with thionyl chloride in excess until solution is complete. The excess of thionyl chloride is removed by distillation (with or without an inert liquid such as benzene) and the residual diphenyl urea 3,3' dicarboxylic acid chloride (1 mol.) is stirred for several hours with an aqueous solution of the sodium salt of m-amino paratoluyl naphthylamine-4,6,8-trisulphonic acid (0.9 mol.) with or without the addition of a mild alkali such as sodium carbonate, or sodium acetate, until the solution ceases to give a red coloration when treated with sodium nitrite, hydrochloric acid and resorcinol. The solution is filtered from tar, evaporated to dryness, preferably in vacuum, and extracted with methyl alcohol, the clear methyl alcoholic solution is poured into a large bulk of absolute ethyl alcohol and the precipitated compound filtered off and dried.

The reactions taking place in the foregoing example may be illustrated as follows:

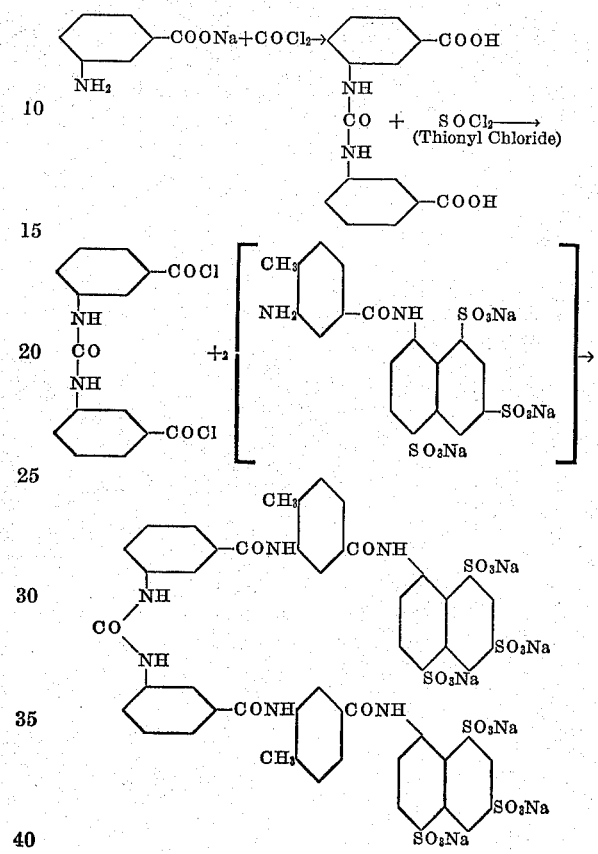

The process and reactions with the thioureas are similar.

What we claim as our invention is:

1. Diphenyl urea 3,3'-dicarboxylic acid chloride:

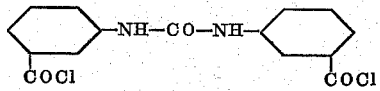

2. Diaryl dicarboxylic acid halides having the formula

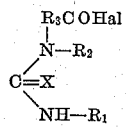

in which one of the groups $R_1$ and $R_2$ represents hydrogen, the other representing $R_4COHal$, where $R_3$ and $R_4$ represent organic radicals containing an aryl nucleus attached to N of the formula by way of carbon and with the groups COHal attached to the aryl nuclei thereof, and X is an element of the group consisting of sulphur and oxygen.

3. Diaryl dicarboxylic acid halides having the formula

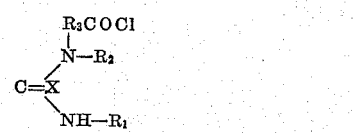

in which one of the groups $R_1$ and $R_2$ represents hydrogen, the other representing $R_4COCl$, where $R_3$ and $R_4$ represent organic radicals containing an aryl nucleus attached to N of the formula by way of carbon and with the groups COCl attached to the aryl nuclei thereof, and X is an element of the group consisting of sulphur and oxygen.

4. Diaryl dicarboxylic acid halides having the formula

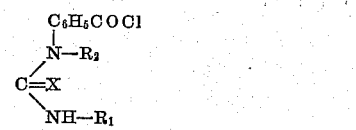

in which one of the groups $R_1$ and $R_2$ represents hydrogen, the other representing $C_6H_5COCl$ and X is an element of the group consisting of sulphur and oxygen.

GEORGE MALCOLM DYSON.
ARNOLD RENSHAW.